HOUSING FOR INDICATING LAMP OR OTHER ELECTRICAL COMPONENTS

Original Filed March 2, 1965 6 Sheets-Sheet 1

INVENTOR.
HERMAN RUEGER
BY Curtis, Morris & Safford

HOUSING FOR INDICATING LAMP OR OTHER ELECTRICAL COMPONENTS

Original Filed March 2, 1965 6 Sheets-Sheet 2

INVENTOR.
HERMAN RUEGER
BY Curtis, Morris & Safford

HOUSING FOR INDICATING LAMP OR OTHER ELECTRICAL COMPONENTS

Original Filed March 2, 1965 6 Sheets-Sheet 3

INVENTOR.
HERMAN RUEGER
BY Curtis, Morris & Safford

HOUSING FOR INDICATING LAMP OR OTHER ELECTRICAL COMPONENTS

Original Filed March 2, 1965 6 Sheets-Sheet 4

INVENTOR.
HERMAN RUEGER
BY Curtis, Morris & Safford

HOUSING FOR INDICATING LAMP OR OTHER ELECTRICAL COMPONENTS

Original Filed March 2, 1965 6 Sheets-Sheet 1

INVENTOR
HERMAN RUEGER
BY
Curtis, Morris & Safford

HOUSING FOR INDICATING LAMP OR OTHER ELECTRICAL COMPONENTS

Original Filed March 2, 1965 6 Sheets-Sheet 6

INVENTOR
HERMAN RUEGER
BY
Curtis, Morris & Safford

United States Patent Office

Re. 27,003

Reissued Dec. 15, 1970

27,003

HOUSING FOR INDICATING LAMP OR OTHER ELECTRICAL COMPONENTS

Herman Rueger, Lancaster, Pa., assignor to AMP Incorporated, Harrisburg, Pa.

Original No. 3,289,200, dated Nov. 29, 1966, Ser. No. 436,514, Mar. 2, 1965, which is a continuation-in-part of Ser. No. 318,977, Oct. 25, 1963. Application for reissue Nov. 27, 1968, Ser. No. 786,497

Int. Cl. G09f *9/00*

U.S. Cl. 340—381 11 Claims

Matter enclosed in heavy brackets [ ] appears in the original patent but forms no part of this reissue specification; matter printed in italics indicates the additions made by reissue.

*ABSTRACT OF THE DISCLOSURE*

*An indicating light comprises a dielectric housing in which a light bulb and electrical leads connected to the filament of the light bulb are housed. An opening is provided in a front part of the housing in alignment with a section of the light bulb. A lens member is positioned in an aperture of a panel and it contains a section for engagement with the housing to maintain the housing in position on the panel and in alignment with the housing opening.*

This application is a continuation-in-part of Ser. No. 318,977, filed Oct. 25, 1963, *now U.S. Pat. No. 3,320,607.*

This invention relates to lamp housings adapted preferably to be mounted on a mounting means, such as a panel and in which indicating lamps or other suitable electrical components are mounted.

The use of indicating lamps, especially in small form, due to miniaturization and other features, has become increasingly important in many fields, such as testing, appliance, communication, automotive, computer control, etc., in order to provide an indication for various conditions or functions.

One problem with regard to prior art housings has been that they are too large and bulky. Another problem has been that they have more than one separate part. A further problem has been that the housings have not provided sufficient protection to the parts encased therein. An additional problem has been that the housings have not been adaptable for mounting on mounting means of various thicknesses. A still further problem has been that additional means have been used to mount the housings on mounting means which makes the housing difficult to mount and dismount.

The present invention, therefore, obviates the foregoing and other problems, and it is an important object of the present invention to provide a housing which is small in size and not bulky and which is adapted to be utilized in a small space.

It is another object of the present invention to provide a housing which can be easily mounted on various size mounting means without the use of additional complicated means such as screws, bolts, threads, etc.

A further object of the present invention is the provision of a housing which provided sufficient protection to the parts disposed therein.

A still further object of the present invention is to provide a housing which is cheap to manufacture, rugged in construction, long-lasting and readily replaceable.

An additional object of the present invention is to provide a novel connector member to interconnect the leads of the electrical component disposed in the housing and the electrical supply leads.

A still additional object of the present invention is the provision of a combined mounting post and strain relief in the housing.

Still a further object of the present invention is the provision of a housing member disposed in a juxtaposed position on a panel and a member slidable through an opening in the panel which is matable with the section of the housing member.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying it in practical use so that they may modify it in various forms, each as may be best suited to the conditions of a particular use.

Figure 1:
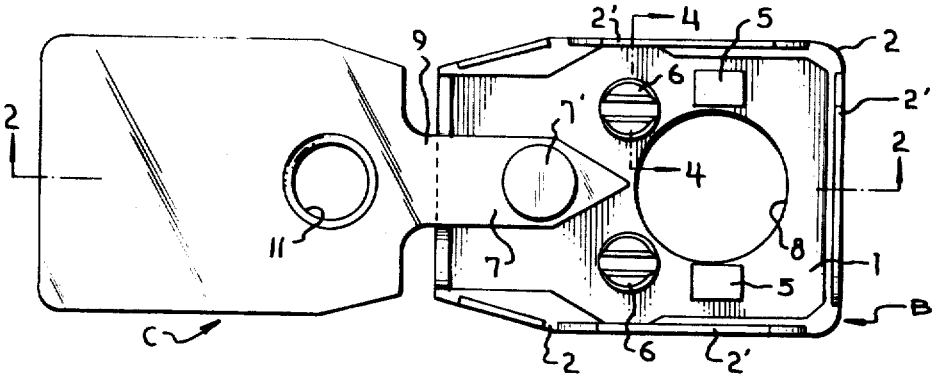
FIGURE 1 is a top plan view of the housing in an open position without any components therein.
Figure 2:
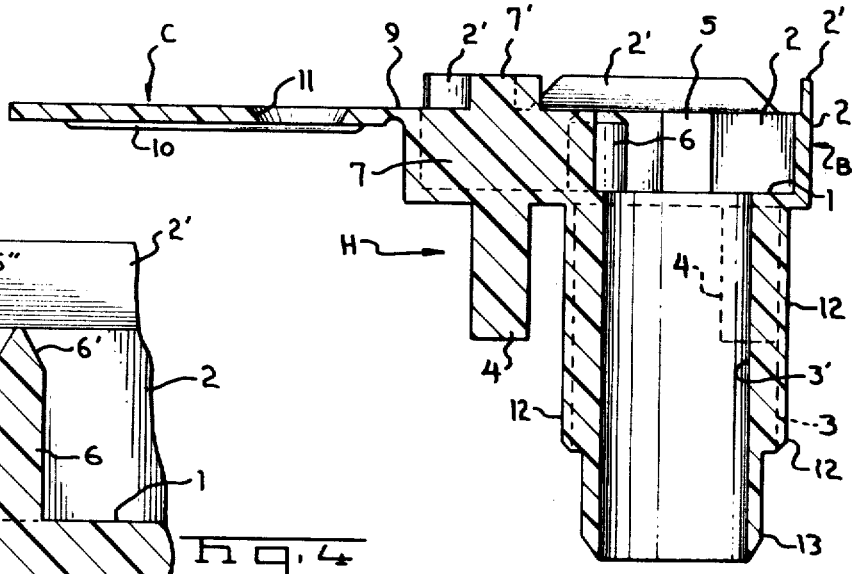
FIGURE 2 is a cross-sectional view taken along lines 2—2 of FIGURE 1.
Figure 4:
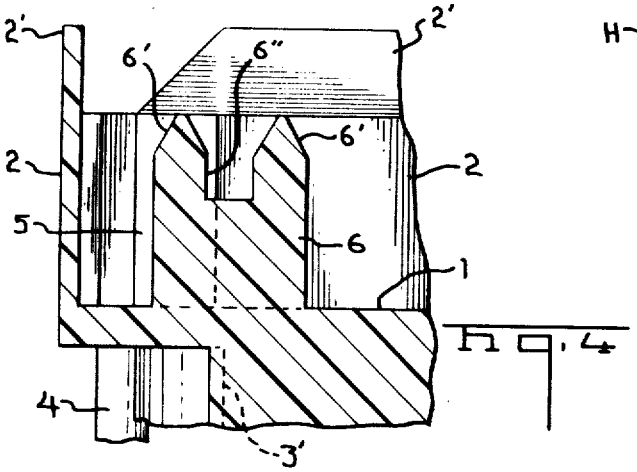
FIGURE 4 is a part cross-sectional view taken along lines 4—4 of FIGURE 1.
Figure 3:
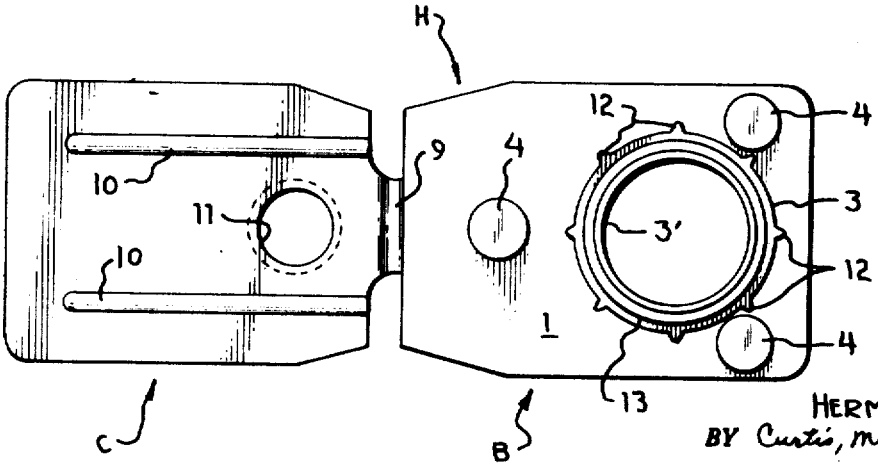
FIGURE 3 is a bottom plan view of FIGURE 1.

The present invention will be described in connection with a signal lamp; however, it is to be understood that other electrical components can be housed therein, such as switches, thermistors, photocells, etc.

Turning now to the drawings, and more particularly FIGURES 1–4, there is shown a one-piece housing H comprising a body B and a cover C. Body B includes a floor 1, walls 2, a sleeve section 3 and stabilizing members 4.

Extending outwardly from floor 1 within walls 2 are engaging members 5, mounting and retaining posts 6 and separating member 7. An opening 8 is disposed in floor 2.

Engaging members 5 have substantially the same height as walls 2, and cover C engages them and the tops of the walls in order to be supported thereby when the housing is closed. A space is provided between walls 2 and engaging members 5. Posts 6 are preferably cylindrical in cross-section and each include a tapered section 6' at the outer end and a slot 6'' disposed therein. Slot 6'' is tapered at the entrance thereof.

Walls 2, except the end wall adjacent separating member 7, have extensions 2' which are not as thick as walls 2 and whose outer surfaces are in the same plane as the outer surfaces of the walls. Since extensions 2' are not as thick as walls 2, the tops of the walls provide the support mentioned above for cover C. As can be seen, housing H preferably inclines slightly toward the longitudinal axis thereof. Extensions 2' on the front wall and side walls, except the inclined part, have tapered ends; however, if desired, the extensions on the side walls can be one piece and have a V-shaped notch disposed therein at the point of inclination.

Separating member 7 has a projection 7' extending outwardly therefrom. The sides of separating member 7 are spaced from walls 2, and they taper to a point contiguous opening 8. Cover C is hingedly connected to the top end part of separating member 7 by a piece 9, and the section thereof adjacent member 7 is preferably thinner than cover C in order to allow the cover to be easily bent over onto body B.

Cover C has a configuration corresponding to that provided by walls 2 and comprises reinforcing projections 10 and an opening 11 therein which engages projection 7' when the cover is placed into position on body B in order to aid in retaining the cover in closed position and to prevent the cover from peeling. Opening 11 is preferably tapered in order to easily engage projection 7'.

Sleeve action 3 has a bore 3' corresponding to the diameter of opening 8 and is in communication therewith. Sleeve section 3 is preferably disposed at right angles to floor 1 but can be disposed at other angular positions with respect thereto depending upon the prevailing conditions. Spaced ribs 12 are on the outer surface of sleeve section 3 and extend outwardly therefrom. The outer part of sleeve section 3 has an outer smooth surface 13 which has a smaller diameter than the part containing ribs 12. The outer end of sleeve section 3 and the outer end of the rib containing part are preferably tapered.

Members 4 extend outwardly from floor 1 and are parallel with respect to the axis of sleeve section 3 and can be any predetermined length. While only three have been shown, it is obvious that more can be provided.

Housing H is made of any suitable dielectric material such as nylon, polypropylene, etc., and is preferably molded; however, it can be made in any manner to attain the desirable result.

Figure 5:
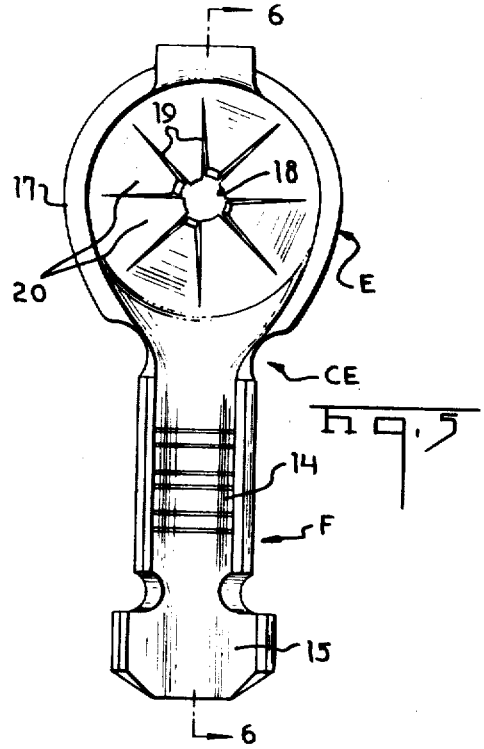
FIGURE 5 is a top plan view of a connector element that can be utilized with the present invention.
Figure 6:
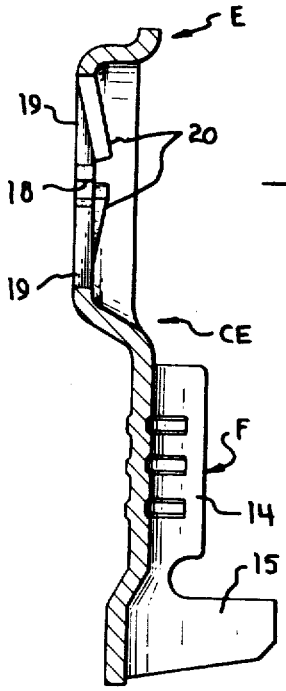
FIGURE 6 is a cross-sectional view taken along lines 6—6 of FIGURE 5.
Figure 11:
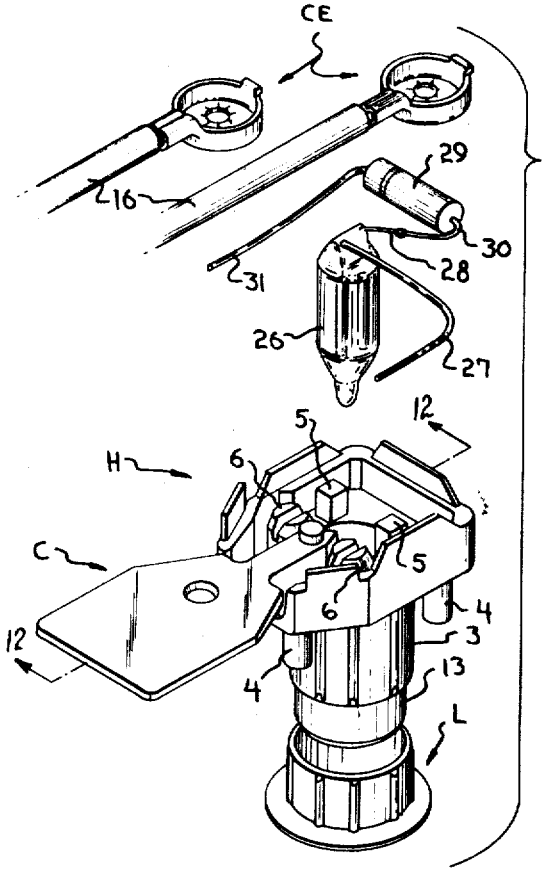
FIGURE 11 is an exploded perspective view of the housing and components to be disposed thereon.
Figure 12:
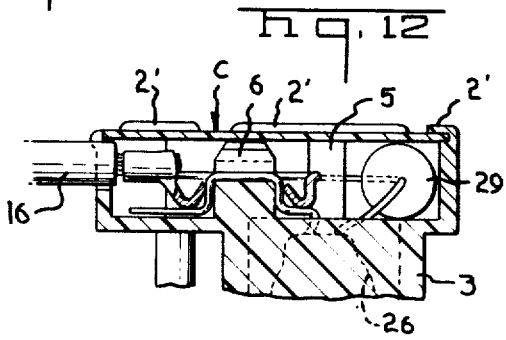
FIGURE 12 is a cross-sectional view taken along lines 12—12 of FIGURE 11 and with the components in place.
Figure 13:
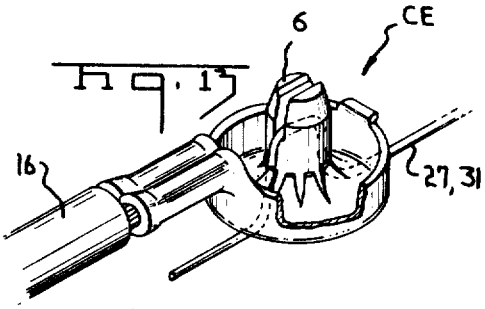
FIGURE 13 is a part-sectional view showing the connector element of FIGURES 5 and 6 in operation.
Figure 14:
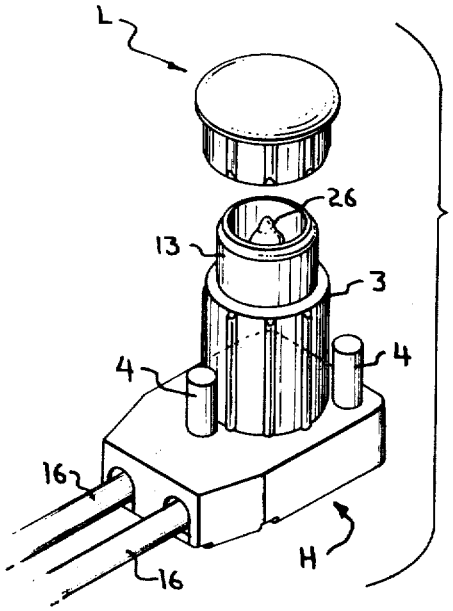
FIGURE 14 is a perspective exploded view of the present invention.

Turning now to FIGURES 5 and 6, there is shown a connector element CE which is adapted to engage each of posts 6. The connector element is preferably formed by conventionally stamping a sheet metal blank or strip of a suitable, electrically-conductive material such as brass, bronze or other alloy; the metal being sufficiently hard to provide excellent spring quality thereto. Connector element CE comprises a ferrule portion F and an engaging portion E. Ferrule portion F includes conductor engaging section 14 and insulation engaging section 15 for engaging a conductor means (not shown). If desired, insulation engaging section 15 can be eliminated and only conductor engaging section 14 can be utilized to mechanically and electrically secure the conductor of conductor means 16 as shown in FIGURES 11–13 by cold-forging techniques disclosed in U.S. Patent 2,600,012. Of course, the conductor can be secured to the connector element by other means, if desired.

Post-engaging portion E comprises a cup-shaped section 17 having an aperture 18 in the bottom thereof with radial slits 19 extending outwardly therefrom to form substantially triangularly-shaped spring engaging members 20 which resiliently engage posts 6 (see FIGURE 13).

Figure 7:
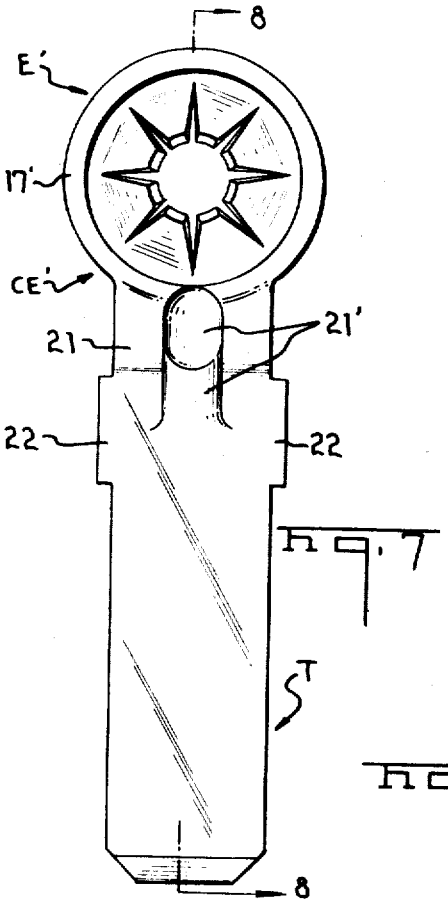
FIGURE 7 is a view similar to FIGURE 5 but of an alternative embodiment thereof.
Figure 8:
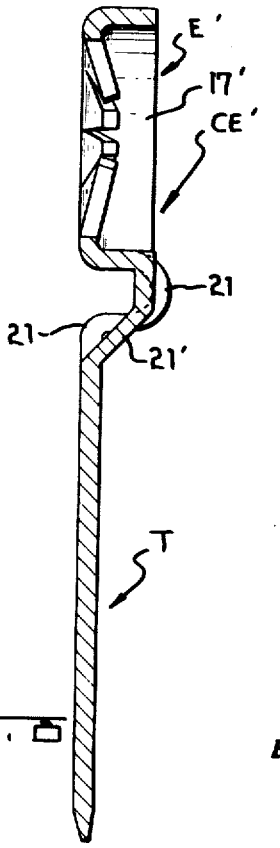
FIGURE 8 is a cross-sectional view taken along lines 8—8 of FIGURE 7.

FIGURES 7 and 8 show an embodiment of the connector element designated CE'. In this embodiment, connector element CE' is similar to FIGURES 5 and 6 except instead of a ferrule portion F, there is provided a tab portion T extending outwardly from engaging portion E'. Tab portion T is connected to cup-shaped section 17' by an intermediate section 21 connected to the top of cup-shaped section 17'. Intermediate section 21 has extending outwardly from each surface thereof projections 21' which provide strength therefor.

The free end of tab portion T is preferably tapered at the sides and ends to facilitate the insertion thereon of a suitable connector element (not shown) such as the receptacle connector element disclosed in U.S. Patent Nos. 2,774,951 and 2,791,755. Tab portion T also preferably includes lugs 22 extending outwardly from each side which act as stop means to prevent the receptacle connector element from passing there-beyond.

While the electrical connector has been described as being frictionally mounted on plastic posts 6, it is to be understood that it can be frictionally mounted on other types of posts such as metal, wood, etc.

Figure 9:
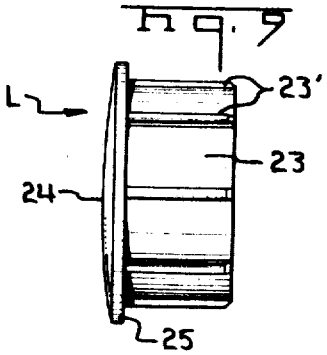
FIGURE 9 is a side elevational view of a lens member for use with the present invention.
Figure 10:
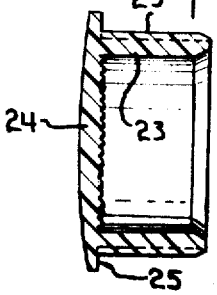
FIGURE 10 is a cross-sectional view of FIGURE 9.

FIGURES 9 and 10 illustrate the lens structure L which has a tubular section 23 whose inside diameter is slightly greater than surface 13 of sleeve section 3 onto which the lens is mounted. The entrance to section 23 is tapered in order to facilitate the insertion of the lens onto sleeve section 3. Lens section 24 extends across one end of section 23 and preferably has an inner serrated or scored surface and an outer smooth curved surface. An annular flange 25 extends outwardly from the outer surface of tubular section 23 adjacent lens section 24. Spaced ribs 23' also are disposed on the outer surface of tubular section 23 and the height thereof and the spacing therebetween preferably corresponds to those of ribs 12 of sleeve section 3. The outer ends of ribs 23' are preferably tapered to facilitate easy insertion within an aperture of a mounting means.

Lens structure L is preferably molded from a suitable plastic material such as nylon, Plexiglas, glass, etc., and can be made in different colors such as red, orange, amber, yellow or natural (clear) thereby providing interchangeable color combinations. While the lens structure is provided with different colors, the housing is preferably one color. Also, the lens structure can be made into other desirable shapes.

FIGURE 11 shows the housing H in an open position in order to receive a conventional lamp 26, such as a neon lamp means having lead wires 27, 28 extending outwardly therefrom; a proper size resistor 29 having one lead 30 serially connected to lead 28 and another lead 31; connector elements CE provided with conductor means 16; and lens structure 1. While a neon lamp means has been described, it is to be understood that an incandescent lamp means or other similar lamp means can also be used in place thereof.

In assembly, as shown in FIGURES 11–13, lamp means 26 is disposed within sleeve 3; resistor 29 is disposed between the front wall and engaging members 5; lead wire 27 is disposed in the slot of respective post 6; lead wire 31 is disposed between an engaging member 5 and a side wall and in the slot of respective post 6; and the cup-shaped section 17 of each connector element is forced onto each post 6 through aperture 18 so that each lead wire is bent against the sides of post 6 and against floor 1 by spring-engaging members 20 and the bottom of the cup-shaped section. Spring-engaging members 20 engage their corresponding posts 6 in such a manner to provide a secure engagement therebetween which in turn, provides excellent electrical connection as well as excellent retention properties thereby obviating electrical and mechanical disconnection.

After components have been properly arranged in housing H, cover C is then folded into position thereover as shown in FIGURE 12 into engagement with engaging members 5, walls 2, and posts 6, separating member 7 and projection 7' passes through opening 11. Heat is applied to extensions 2' in order to bend them into engagement with cover C where they remain in order to maintain the cover in position. As can be seen from FIGURE 12, part of the insulation of conductor means 16 is disposed within the housing. Thus, no bare parts of the electrical components are uncovered thereby providing a housing structure which is compact, strong and one piece.

While the foregoing provides a housing with conductor means permanently connected therein, connector elements CE' of FIGURES 7 and 8 may be uilized so that no conductor means are permanently connected in the housing, but the tab portions thereof extend outwardly from the housing and are engaged by connector elements such as that disclosed in the above-mentioned patents. This enables the conductor means to be quickly connected and disconnected from the assembly when necessary.

Figure 15:
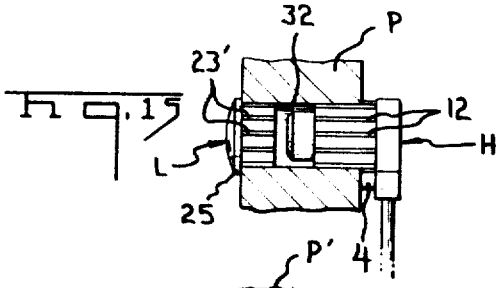
FIGURES 15 and 16 show the housing of FIGURE 14 and lens mounted in different size panels.
Figure 16:
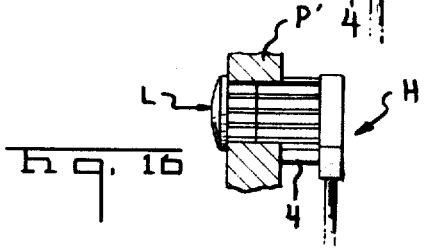

FIGURES 15 and 16 show the embodiment described hereinabove mounted in panel means P. As shown in FIGURE 15, housing H is disposed in an opening of aperture 32 of panel means P which has a thickness greater than sleeve section 3 of housing H. Aperture 32 has a diameter between the outside diameter provided by ribs 12 and the outer surface of sleeve 3 so that when sleeve 3 is inserted within aperture 32, it will be retained therein by ribs 12 as a result of frictional engagement therebetween. As can be seen, members 4 engage panel means P in order to limit the inward movement of sleeve 3 within aperture 32. Members 4 can be provided with a predetermined length during molding of the housing or can be provided with a length equal to the ribbed section of sleeve 3 and cut to the desired length when the housing is to be inserted in a panel means.

Lens structure L is inserted within the other opening of aperture 32 and is retained therein by ribs 23' in a similar manner as the housing. Flange 25 abuts against panel means P to limit the inner movement of the lens.

As can be discerned, there has been provided a housing which can be retained within an aperture of a panel means which has a thickness greater than the part of the housing disposed therein. The same is true with regard to the lens structure.

FIGURE 16 is similar to that of FIGURE 15 except panel means P' is thinner than that of FIGURE 15 so that members 4 are longer and lens structure L engages surface 13. The housing and lens structure can therefore be disposed on panel means of various thicknesses. Thus, the ribs of the housing and lens structure frictionally engaging the aperture and the frictional engagement of the lens structure on the housing provide an excellent mounting on panel means P'. In addition, members 4 engaging the panel means provide stability so that the housing cannot be easily rocked, thereby causing the housing to be worked free of its mounted position.

While the housing and lens structure have been described as separate elements, it is obvious that they can be formed as an integral unit. If this is the desired structure, the lens can still be various colors which naturally will render the unit the same color as that of the lens, and, of course, the flange will not be necessary.

FIGURES 17–20 illustrate an embodiment of the present invention which is the same as the embodiment described above except that no stabilizing members 4 are provided on housing H'. Instead of members 4, there is provided a spacer sleeve 4' of suitable material such as plastic, metal, etc., which has an inside diameter between the outside diameter provided by ribs 12 and the outer surface of sleeve 3.

Figure 17:
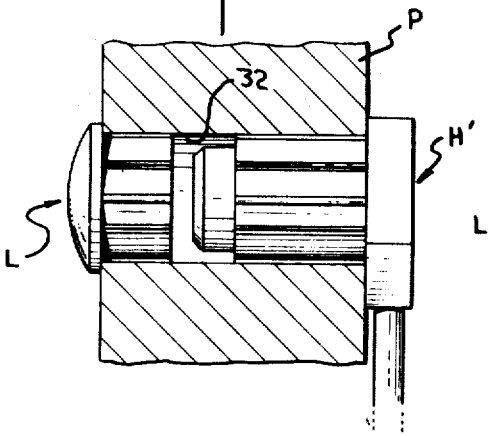
FIGURES 17–20 show an embodiment of the present invention mounted in different size panels.
Figure 18:
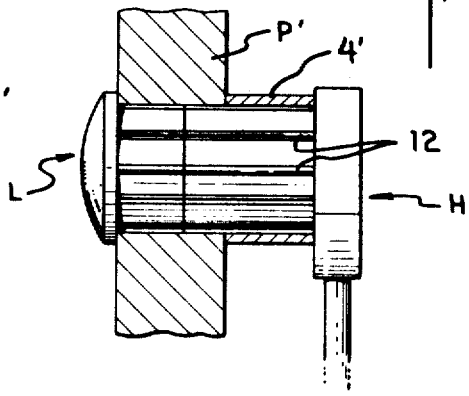
Figure 19:
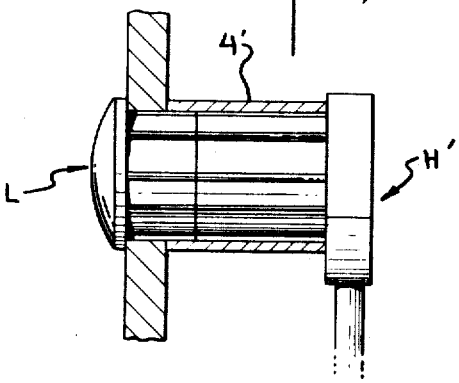
Figure 20:
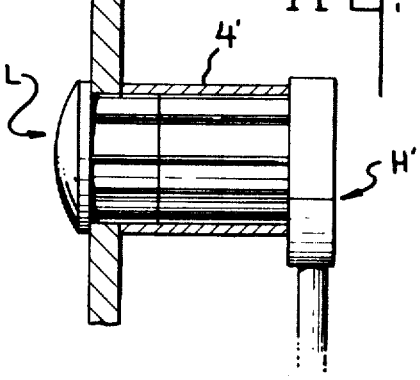

In FIGURE 17, housing H' and lens structure L are disposed in aperture 32 of panel means P as in FIGURE 15, and since the panel means is thick enough, no spacer sleeve is necessary. However, in FIGURES 18–20, a spacer sleeve is utilized in order to provide stability in FIGURE 18 and in FIGURES 19 and 20, the spacer sleeve not only provides stability but also part of the mounting means. Thus, the length of spacer sleeve 4' is determined by the thickness of the panel means in the same manner as members 4.

While FIGURES 15 and 17 show a panel means of large thickness, greater thicknesses can be used. If this be the case, then the aperture can be coated with a reflective substance in order to aid the transmission of light from the lap means.

Figure 21:
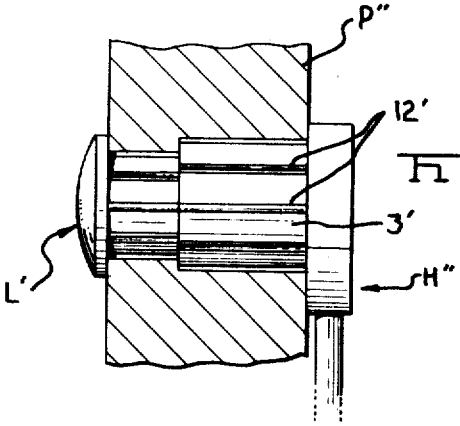
FIGURE 21 shows a further embodiment of the present invention.

FIGURE 21 shows a further embodiment of the present invention which comprises a housing H'' similar to that in FIGURES 17–20 but preferably with the surface 13 eliminated, and sleeve 3' is retained in an opening in panel means P'' by ribs 12'. Lens structure L' is smaller than sleeve 3' and is disposed in a smaller opening in the panel means which is in communication with the sleeve opening. Of course, housing H'' and lens structure L' without a flange can be an integral unit and the ribs on the sleeve and lens structure would provide adequate retention characteristics to maintain the housing in place.

The part of housing H' and H'' adjacent the sleeve in FIGURES 17 and 21 engages the mounting or panel means thereby providing stability therefor as does members 4 and spacer sleeve 4' in FIGURES 16 and 17–20.

The present invention provides for the removal of the housing from the mounting means while leaving the lens structure thereon, if these elements are separate; and the housing keeps the electrical components and their lead wires in place thereby preventing accidental shifting causing shorts.

As can be discerned from the foregoing, there has been described a unique housing which houses electrical components therein a protective and compact manner as well as a housing which is easily mounted on a mounting means of various thicknesses and which does not require much space. The housing is, therefore, versatile, has high electrical and mechanical quality, is simple in assembly and inexpensive in construction. In addition, there has been described a novel electrical connector to be utilized in connection with the instant housing or other suitable connections.

Figure 22:
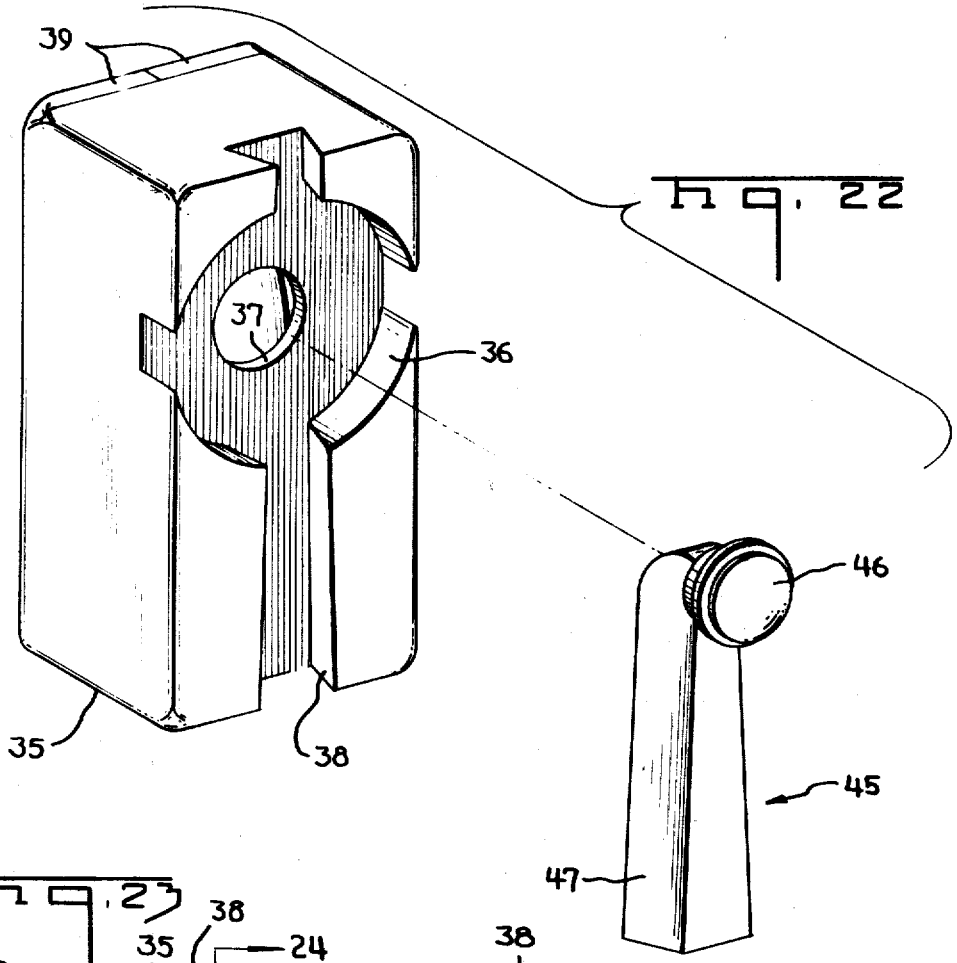
FIGURE 22 is an exploded perspective view of an additional embodiment of the present invention.
Figure 23:
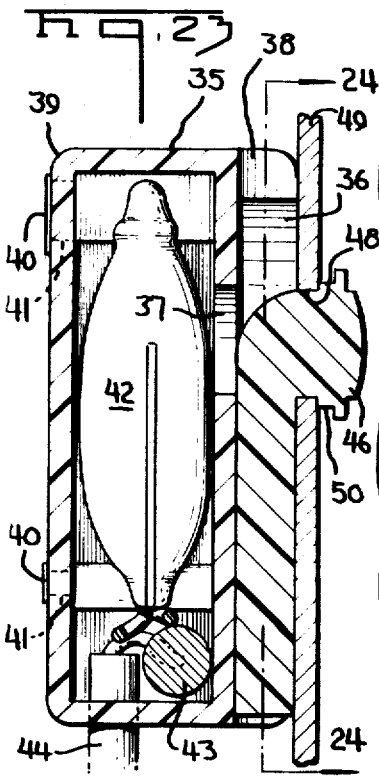
FIGURE 23 is an elevational cross-sectional view of the embodiment of FIGURE 22 mounted on a panel.
Figure 24:
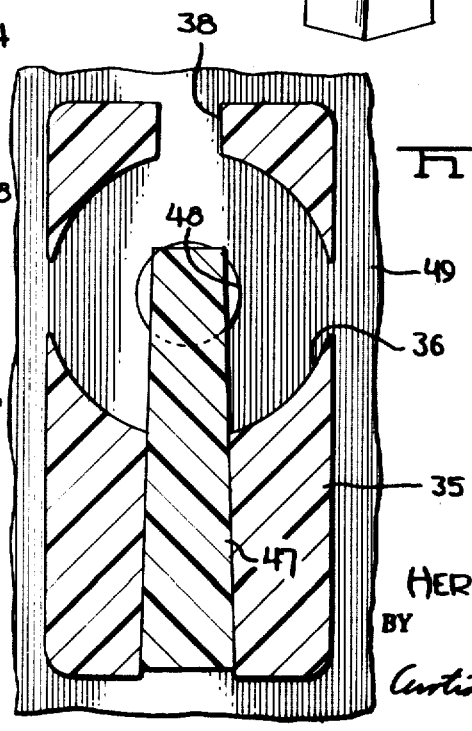
FIGURE 24 is a view taken along lines 24—24 of FIGURE 23.

FIGURES 22 through 24 illustrate a further embodiment of the present invention which comprises housing 35 having a circular recess 36 disposed in the front surface. An opening 37 is disposed in the front surface of housing 35 and is centrally located within circular recess 36. A slot 38 having a dove-tailed configuration is also disposed in the front surface of housing 35 with recess 36 breaking the continuity thereof as it extends from the top to the bottom of the housing. Slot 38 has a converging configuration from the bottom to the top of housing 35. Cover members 39 are integral parts of housing 35 and each cover member is integrally connected to each rear side of the housing.

Projections 40 extend outwardly from interior sections of the housing and these projections mate with corresponding openings 41 in the cover members. After the appropriate electrical components have been placed within the housing, cover members 39 are moved to their closed position and heat is applied to the parts of projections 40 extending outwardly from the cover members to cause these parts to be made larger than their corresponding openings in order to secure the cover members in a closed position. Other means may of course be utilized to secure the cover members in a closed position.

Prior to the cover members being moved to their closed position, a neon lamp 42 is suitably positioned within housing 35 in a position normal to the axis of opening 37 as illustrated in FIGURE 23. The leads of the neon lamp are appropriately connected to a conventional resistor 43 and lead means 44. An incandescent lamp means or other similar lamp means may of course be used in place of neon lamp 42. Leads of neon lamp 42 may be connected to lead means 44 in a manner similar to that described hereinabove or in any other suitable manner.

Figure 25:
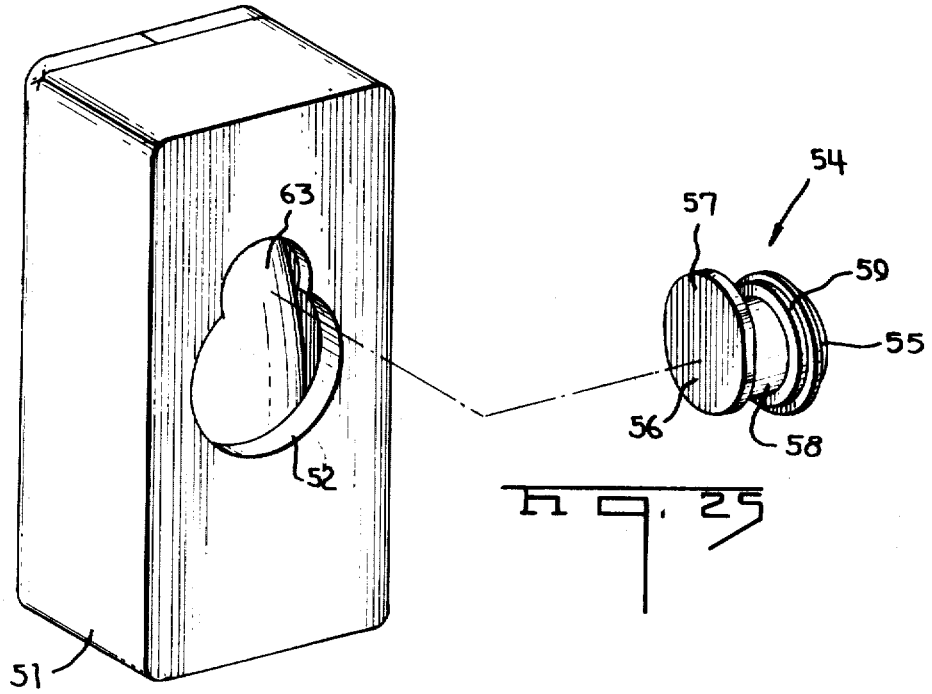
FIGURE 25 is an exploded perspective view of still a further embodiment of the present invention.
Figure 26:
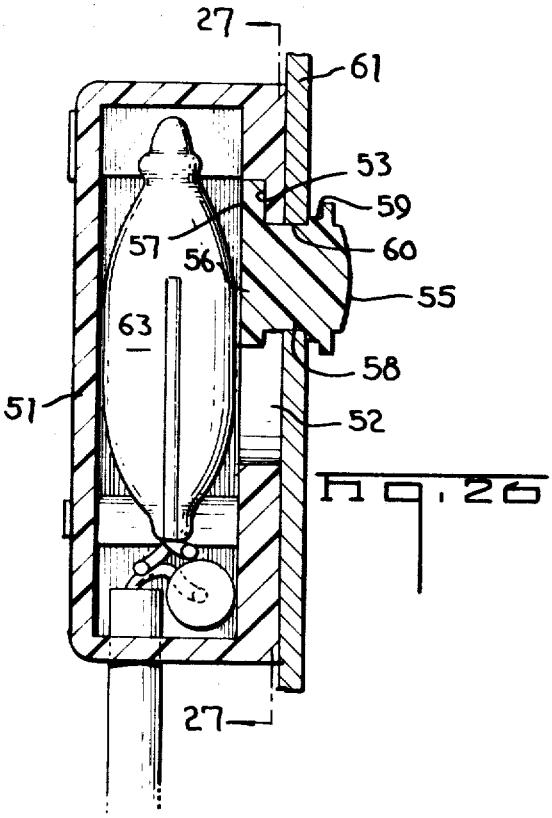
FIGURE 26 is an elevational cross-sectional view of the embodiment of FIGURE 25 mounted on a panel.
Figure 27:
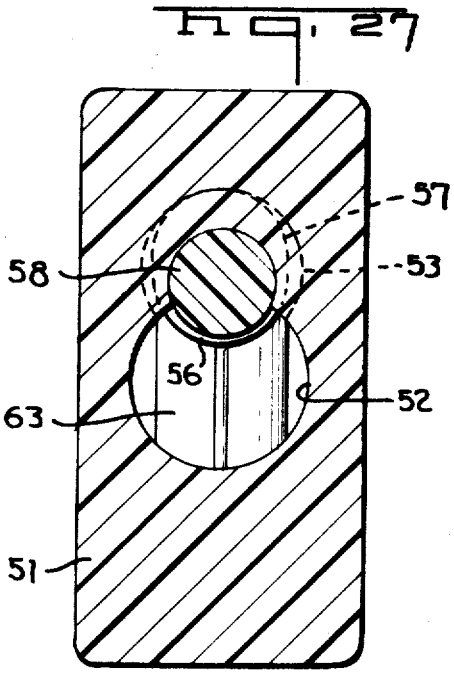
FIGURE 27 is a view taken along lines 27—27 of FIGURE 26.

Lens means 45 comprises a one-piece transparent or translucent members having a lens section 46 and a stem section 47 which has a dove-tailed configuration matable with dove-tailed slot 38. The largest cross-sectional area or stem section 47 which is remote from lens section 46 is slightly smaller than aperture 48 in a panel 49 so that the stem section can be passed therethrough in order to mount lens means 45 on the panel as illustrated in FIGURE 23. Lens section 46 includes an annular flange 50 which is larger than aperture 48 and this prevents the lens means from passing through the aperture. After lens means 45 has been mounted on panel 49 housing 35 is placed above stem section 47 with slot 8 in alignment therewith. Housing 35 is then moved downwardly with slot 38 mating with stem section 47 and the housing is moved downwardly until lens section 46 is in alignment with opening 37 so that when lamp 42 is energized the light therefrom will be transmitted through lens section 46. With this type of housing member, no means are needed to secure the housing onto a panel other than the lens means and the housing is disposed in a juxtaposed position relative to the panel so that the housing does not extend outwardly from the panel an excessive amount as in the case of housings that are in axial alignment with their lens means. Turning now to the embodiment illustrated in FIGURES 25–27 there is shown a housing 51 which is similar to housing 35 except that instead of housing 51 having a dove-tailed slot, housing 51 comprises, in the front surface thereof, a key hole slot 52 having large and small portions. A recessed section 53 is disposed in the rear surface of the front surface of the housing. Recessed section 53 is coaxial with respect to the small or reduced portion of slot 52 and is in communication therewith.

Lens means 54 comprises lens section 55 and a flange section 56. An extension 57 is located on flange section 56 which is disposable within recessed section 53 of housing 51. A round or stem part 58 interconnects flange section 56 and lens section 55. An annular flange 59 is located adjacent lens section 55. The diameter of flange section 56 excluding extension 57 is substantially the same as that of annular section 59. Lens means 54 is made from any suitable transparent or translucent material.

Lens means 54 is adapted to be disposed in an aperture 60 and panel 61. The lens means is tilted so that flange section 56 and extension 57 thereof are passed through aperture 60 and as soon as flange section 56 and extension 57 thereof have passed through the aperture lens means 54 is moved to its non-tilted position and annular flange 59 is moved in engagement with the front surface of panel 61. Housing 51 is moved toward lens means 54 and into engagement with the rear surface of panel 61 with flange section 56 and extension 57 being surrounded by the larger or introducing portion of slot 52. Housing 51 is then moved in a downward direction so that part 58 rests in the small portion of slot 52 and extension 57 is disposed within recessed section 53 in a snug manner so as to define a holding portion to maintain housing 51 in position on panel 61; lamp means 63 is disposed in alignment with lens means 54 so that light being generated via lamp means 63 is transmitted through lens means 54.

As can be discerned from the embodiments illustrated in FIGURES 22 through 27 the lens means serves the function of providing a lens section for transmission of light generated by the lamp means disposed in the housing as well as the function of providing a holding means to hold the housing for the lamp means in a juxtaposed position relative to the panel. While the lens sections of lens means 45 and 54 have been illustrated as being round they can take any desirable configuration such as, for example, diamond, arrow, etc. Another use with regard to lens means 45 would be as an indicating means without the use of a light means and the lens means may be fluorescent and held in position on a panel by means of a shaped metal piece, plastic piece or the like leaving a slot to fit the stem section. Of course, lens means 45 may be held on a panel in the manner just stated adjacent a light means and light from the light means being transmitted by the light means.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A *one-piece plastic molded* housing for electrical components mountable on a mounting member, said housing comprising a body portion having *base, side and top wall portions to define cavity* means to *enclose and* maintain the electrical components in position therewithin, said mounting member having an opening therein, *mounting means formed in said housing,* holding means slidable through said opening in the mounting member, said holding means including means to prevent the holding means from passing through the opening, and *engaging* means on said holding means mateable with said [body portion] *mounting means of said housing* to hold the body portion in a juxtaposed position on said mounting member.

2. A *one-piece plastic molded* housing according to claim 1 wherein said *engaging* means on said holding means comprises a dove-tailed stem mateable with *said mounting means defining* a dove-tailed slot in said body portion.

3. A *one-piece plastic molded* housing according to claim 1 wherein said *engaging* means on said holding means comprises an extension spaced from said means to prevent the holding means from passing through the opening and mateable with *said mounting means defining* a small portion of a key slot in said body portion.

4. A *one-piece plastic molded* housing for electrical components for disposition on a mounting member, said housing comprising a body portion *having base, side and top walls* in which the electrical components are to be mounted, *the base wall of* said body portion having a slotted section *which has an intermediate neck,* said mounting member having an opening therein, a holding member slidable through said opening in the mounting member, and means on said holding member to prevent the holding member from passing through the opening and *including a stem or shank arranged to fit within, but wider than said neck thereby* to engage said slotted section to hold the body portion in juxtaposed position on said mounting member.

5. A *plastic* signal light housing comprising a body member having a hollow portion for receiving a light means, said body member having an opening communicating with said hollow portion and with said light means, said body member having a slot *with an intermediate neck* therein and in communication with said opening, and lens means for securing said body member to a panel, said lens means having a lens section and stem section *wider than said neck,* said lens section being adapted to be disposed in an aperture of said panel and said stem section mating with said slot to hold said body member in a parallel manner against said panel.

6. A *plastic* signal light housing according to claim 5 wherein said slot and stem sections are dove-tailed shape.

7. A signal light housing comprising a body member having a hollow portion for receiving a light means, said body member having an opening *formed therewithin and* communicating with said hollow portion and with said light means, said opening having a reduced dimension, and lens means having a lens section and a flange section, said lens section being adapted to be disposed in an aperture of a panel, said lens means having means to prevent the lens means from passing through the aperture, said flange section mating with reduced dimension and coming to rest in said reduced dimension upon movement of said body member onto said lens means when said body member is moved along said panel in a parallel manner to cause said flange section to engage said reduced section.

8. For use in a signal structure containing an indicating light; a housing member provided with a chamber to receive said indicating light, an opening in one surface in communication with said chamber and said indicating light and a dove-tailed slot in said one surface in alignment with said opening; and lens means having a lens section and a stem section for disposition in an aperture of a panel with said lens section on one side of said panel and said stem section on the other side of said panel and parallel therewith, said dove-tailed slot matable with said stem section to hold said body member in juxtaposed position against said panel.

9. For use in a signal structure containing an indicating light; a housing member provided with a chamber to receive said indicating light and a keyhole slot in one surface in communication with said chamber and said indicating light, said keyhole slot including a small portion, [and] a large portion *and an intermediate neck therebetween*; and lens means having a lens section, [and] a flange section *and a stem section* for disposition in an aperture of a panel with said lens section on one side of said panel [and], said flange section on the other side of said panel *and said stem section in the aperture of the panel*, said flange section mateable with said large portion of said keyhole slot and coming to rest in said small portion to hold said body member in juxtaposed position against said panel *and said stem section being wider than said neck so that said neck maintains said stem section and said flange section in said small portion.*

10. A signal light housing comprising a body member having a hollow portion for receiving a light means, said body member having a slot therein, said slot being in communication with said hollow portion and said light means, said slot having a first portion and a second portion *and an intermediate neck therebetween*, and lens means for securing said body member to a panel, said lens means having a lens section and a flanged stem section, said lens section being adapted to be disposed in an aperture of said panel and said flanged stem section being disposed in said first portion and coming to rest in said second portion to hold said body member against said panel *and said flanged stem section being wider than said neck so that said neck maintains said flanged stem section in said second portion.*

11. For use in a signal structure containing an indicating light; a housing member provided with a chamber to receive said indicating light and a keyhole slot in one surface in communication with said chamber and said indicating light, said keyhole slot including a holding portion and an introducing portion *and an intermediate neck therebetween*, and lens means having a lens section, [and] a flange section *and a stem section* for disposition in an aperture of a panel with said lens section on one side of said panel, [and] said flange section on the other side of said panel *and said stem section in the aperture of the panel*, said flange section matable with said introducing portion of said keyhole slot and coming to rest in said holding portion to hold said body member in position against said panel *and said stem section being wider than said neck so that said neck maintains said stem section and said flange section in said holding portion.*

References Cited

The following references, cited by the Examiner, are of record in the patented file of this patent or the original patent.

UNITED STATES PATENTS

| | | | |
|---|---|---|---|
| 2,221,078 | 11/1940 | Dotterer | 340—381 |
| 3,083,295 | 3/1963 | Baker | 340—321 |
| 1,351,562 | 8/1920 | Foster | 340—380 |
| 2,786,196 | 3/1957 | Haynes et al. | 340—381 |
| 3,082,395 | 3/1963 | Madansky | 240—8.16X |

HAROLD I. PITTS, Primary Examiner

U.S. Cl. X.R.

240—59; 340—321, 380